United States Patent
Head et al.

[15] 3,646,732
[45] Mar. 7, 1972

[54] CROP HARVESTER

[72] Inventors: Glenn Dale Head, Des Moines; Howard C. Hadley, Dallas Center; both of Iowa

[73] Assignee: Deere & Company, Moline, Ill.

[22] Filed: Apr. 28, 1971

[21] Appl. No.: 138,109

[52] U.S. Cl..................................................56/2
[51] Int. Cl..................................................A01d 45/02
[58] Field of Search..........................56/2, 14.1, 14.2, 51

[56] References Cited

UNITED STATES PATENTS 3,324,637   6/1967   Ashton et al..........................56/2X
3,412,534   11/1968  Teale.

*Primary Examiner*— Louis G. Mancene
*Assistant Examiner*— J. N. Eskovitz
*Attorneys* — H. Vincent Harsha, Harold M. Knoth, William A. Murray, John M. Nolan, Raymond L. Hollister.

[57] ABSTRACT

In a pull-type crop harvester having a main frame and a forwardly directed tongue adapted for connection at its forward end to a tractor drawbar, there is provided on the frame a crop-treating mechanism with a rearwardly directed elevator. The elevator has a housing extending to a forwardly opening inlet and surrounding the inlet is a housing extension that is carried on a transverse horizontal axis and which has a hydraulic cylinder connected thereto for moving the extension about the axis. The extension has means thereon for connecting it to a forwardly positioned harvesting unit.

6 Claims, 5 Drawing Figures

INVENTORS
G. D. HEAD
H. C. HADLEY
BY William A. Murray
ATTORNEY

INVENTORS
G. D. HEAD
H. C HADLEY
BY *William A. Murray*
ATTORNEY 3,646,732

CROP HARVESTER

BACKGROUND OF THE INVENTION

It has heretofore been known to provide combines with feeder houses that may be hydraulically raised and lowered. When such a combine is used with a detachable corn head, the feeder house is raised and lowered for purposes of attaching and detaching the corn head. There have also been pull-type corn huskers with forwardly positioned corn harvesting units mounted thereon. However, the harvesting units are normally rigidly mounted on the husker and there are no means for quickly attaching and quickly detaching the corn head portion from the husker.

There exists in certain parts of the country a demand by farmers of equipment that both shells ears of corn and equipment which husks ears of corn but retains the ears in the unshelled condition. Since the harvesting units are substantially identical whether they are used on a combine or on a husking unit, it is desirable that a single harvesting unit may be used either on the combine or on the husking unit.

SUMMARY OF THE INVENTION

With the above in mind, it is the primary object of the present invention to provide a pull-type husker of the type supported on a pair of transversely spaced-apart wheels and having a forwardly directed rigid tongue that is adapted for connection to a tractor. The husking unit includes a forwardly and downwardly inclined elevator and a surrounding housing for the elevator that opens at its forward end. Pivotally supported to swing about a horizontal axis is an elevator housing extension that has upright side plates movable alongside the side walls of the elevator and a hinged lower extension that extends rearwardly and lies on the floor of the elevator housing. An extensible and hydraulic cylinder operates to swing the extension structure vertically and fore-and-aft on the horizontal pivot. Rigid with the extension structure is an upright plate extending transversely across its forward portion. The plate fits into the rear wall of a corn head. The hydraulic cylinder which adjusts the extension structure may be utilized to raise and lower various portions of the plate structure.

DESCRIPTION OF THE PREFERRED EMBODIMENT

Figure 1:
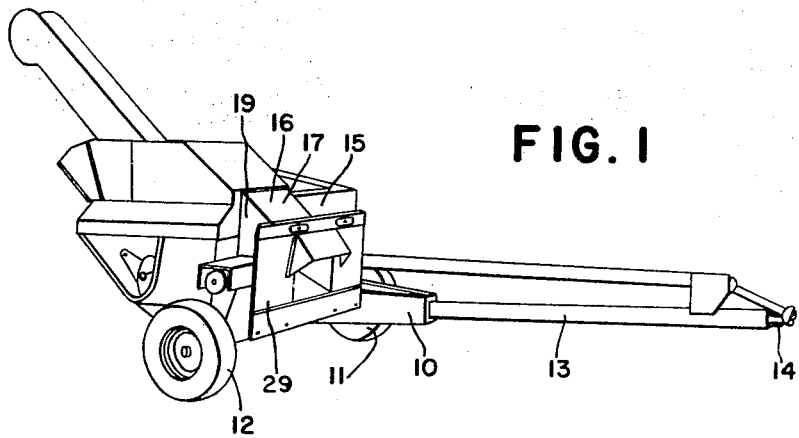
FIG. 1 is a front and right side perspective view of the crop-treating unit without the forward crop-harvesting mechanism attached.
Figure 2:
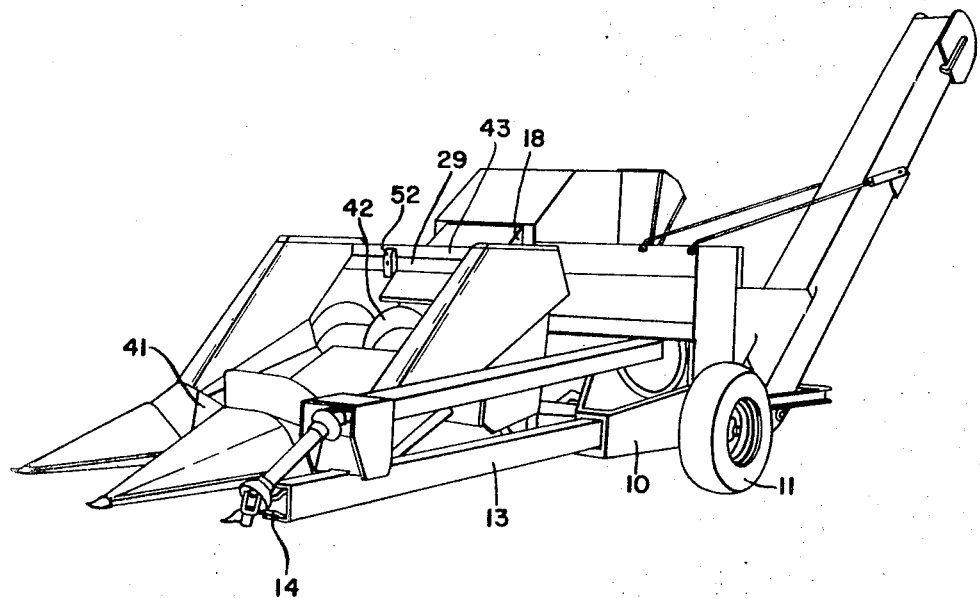
FIG. 2 is a front and left side perspective view of the crop-treating unit with the crop-harvesting attachment mounted thereon.

The crop-treating unit is of a corn-husking variety having a main frame 10 supported on left- and right-hand transport wheels 11, 12 and having a forwardly directed rigid tongue 13 with a hitch connection 14 at its forward end for connection to and support on a tractor drawbar. The husking unit has husking mechanism contained in a housing 15 and a forwardly directed elevator, contained in an elevator housing 16 that projects downwardly and forwardly from the right-hand side of the husking mechanism. The elevator has an overhead wall 17, a pair of side walls 18, 19, and a floor, the edge of which is shown at 20 in FIG. 5. The front edges of the elevator housing 16 define a forwardly opening crop inlet through which material may move into the elevator.

Figure 3:
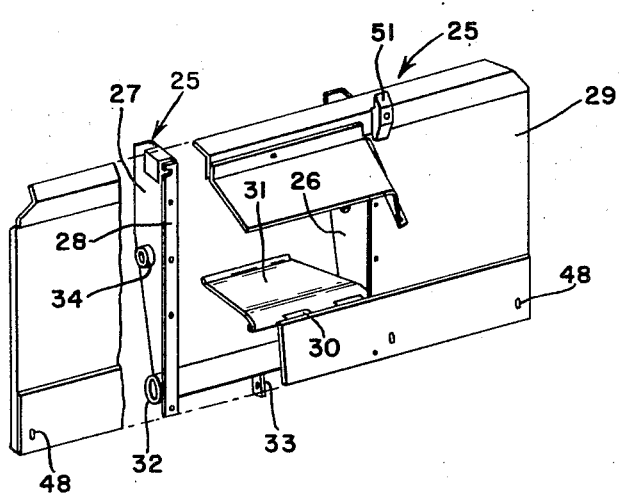
FIG. 3 is a front perspective view of the attachment plate structure that is disposed between a crop-treating unit and the crop-harvesting unit.
Figure 5:
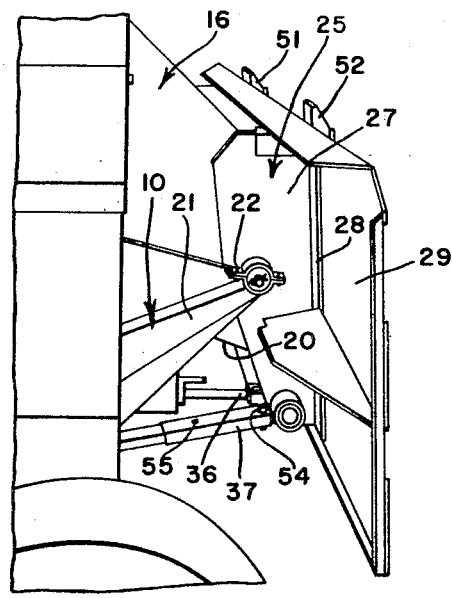
FIG. 5 is a side perspective view of a forward portion of the crop-treating unit and showing the attachment plate structure mounted on the forward end.

As shown in FIG. 5, the main frame 10 has a pair of forwardly directed channels, one of which is shown at 21, on opposite sides of the elevator housing. The forward upper ends of the frame members 21 support bearing blocks 22. Referring to FIGS. 3 and 5, there is provided forwardly of the elevator housing 16 a housing extension structure 25. The extension structure 25 includes a pair of side wall extensions 26, 27 that lie outwardly of the respective side walls 18, 19. The side wall extensions 26, 27 have vertical outwardly extending flanges, one of which is shown at 28 and have connected thereto an upright structural plate member 29. The plate member 29 has a central opening that is in registry with the inlet of the elevator housing 15. The lower edge of the opening has a hinge 30 on which is mounted a rearwardly extending floor extension 31. The floor extension 31 lies on top of the floor of the elevator housing. The side wall extensions 26 and 27 are rigidly interconnected by a transverse tube 32 that has a depending bracket 33 at its central portion. The plate extensions 26, 27 also have transversely extending and outwardly projecting boss portions or trunnions 34. The trunnions or boss portions 34 are received in the bearing blocks 22 at the forward end of the channels 21. The trunnions 34 are substantially midway between the upper and lower ends of the wall extensions 26, 27 and consequently the entire extension structure may swing back and forth on the horizontal axis of the trunnions 34. A hydraulic cylinder 36 extends from the main frame 10 to the bracket 33 and operates to position the extension structure 25 and the vertical plate 29 both fore-and-aft and vertically about the aforementioned horizontal pivot. Positioned alongside and on opposite sides of the cylinder 36 are telescoping links 37, the front ends of which are connected to the outer ends of the tube 32 and the rear ends of which are connected to the implement frame 10. The telescoping links are composed of rectangular-sectioned members that telescope with respect to one another. Bolts 54 are provided for each of the telescoping links 37 so that the links may be fixed or locked at different lengths, openings 55 being provided to receive the bolts.

Figure 4:
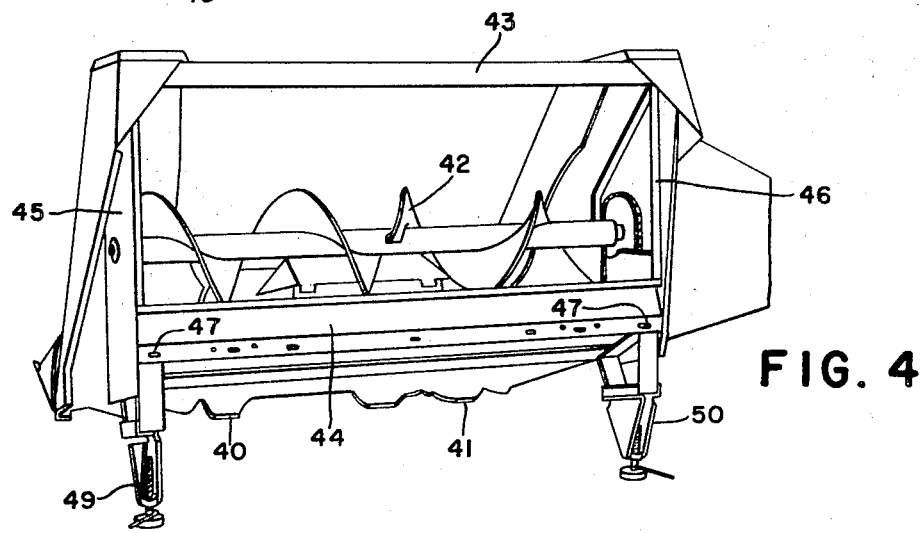
FIG. 4 is a rear perspective view looking into the harvesting unit.

Referring now to FIG. 4, the harvester attachment is composed of a pair of row units shown only partially at 40, 41 that project forwardly and detach ears of corn from adjacent rows as the harvester advances. The row units feed ears of corn rearwardly to a transverse auger 42 which dispatches them centrally and rearwardly. Framework for the harvester includes a rear rectangular upright frame structure having an upper cross beam 43, a lower upright cross plate 44 and a pair of vertical side plates 45, 46. There are opendings 47 on opposite ends of the lower plate 44 that are registrable with openings 48 in the upright plate 29. Bolts or other clamping means may be inserted in the openings for purposes of holding the corn head on the plate structure. When the harvester is detached, a pair of stands 49, 50 is provided to support the rear ends generally at the height of the forward plate structure 29.

When it is desired to mount the harvester unit on the plate structure 29, the husking unit is pulled forwardly so that the plate 29 is substantially aligned with the opening defined by the inner surfaces of the frame members 43, 45. The adjustable jacks 49, 50 may be adjusted, if necessary, to provide the proper vertical positioning of the opening. The husking unit is then moved so that the plate 29 is inserted within the opening. Along the upper edge of the plate 29 there is provided a pair of transversely-spaced and fore-and-aft adjustable clamps 51, 52. These clamps are rotated so that they are disposed vertically and one leg thereof is positioned forwardly of the cross piece 43. They are then tightened until the beam 43 is propelled on the plate 29. The hydraulic cylinder 36 is then extended to raise the row unit header slightly until the openings 47 are in registry with the openings 48. The header is then fixed to the plate 29 by bolts or other clamping means extending through the respective openings 47, 48. The jacks 49, 50 are then removed.

Referring again to the telescoping members 37, normally bolts, such as at 54, are positioned in the forward end and the two telescoping members making up the telescoping links 37 are free to move fore-and-aft. This permits raising and lowering of the row units by the hydraulic cylinder 36. However, when it is desired to move the harvesting unit into transport and there is considerable distance to travel, the bolts 54 are removed and the telescoping links completely extended until the bolts 54 may move through an opening 55 in the forward telescoping member and also through an opening, not shown, in the rear member. In this way, the harvester unit will be held in transport by other than the hydraulic system of the tractor and the cylinder 36. Also, when it is desired to work or repair various portions of the harvester and husking mechanism, it is good safety practice to have a positive lock for holding the harvester unit in a given position rather than to rely upon the cylinder for doing such.

We claim:

1. In a corn harvester having a frame supported on a pair of transversely-spaced transport wheels and having a forwardly projecting tongue adapted for connection at its forward end to a tractor drawbar; a crop-treating mechanism on the frame including a housing with a forwardly opening crop inlet transversely offset to one side of the tongue; a vertical plate structure supported on transverse horizontal pivot means at said inlet and having an opening therein in fore-and-aft registry with the inlet and an upper transverse edge; a harvesting attachment forward of said inlet including a plurality of transversely-spaced harvester row units and including rear upright structure with an opening complementary to and for receiving the vertical plate structure; detachable clamps on the vertical plate structure for preventing separation of said plate structure and said upright structure; and an extensible and retractable hydraulic cylinder anchored at opposite ends to the plate structure and frame for adjusting the plate structure about the pivot means.

2. The corn harvester as set forth in claim 1 further characterized by a telescoping link extending between the plate structure and frame with means associated therewith for locking the link at different lengths.

3. The corn harvester as set forth in claim 1 in which the inlet is rectangular and is formed by an open front end of a fore-and-aft extending elevator housing having a floor and overhead wall interconnected by two vertical side walls, and further characterized by the plate structure having a pair of rearwardly projecting upright panels disposed alongside the front ends of the side walls and a horizontally hinged panel connected to the plate structure and overlying the front end of the floor.

4. In a harvester having a frame supported to rock, unless restricted, on a pair of transversely-spaced transport wheels and including a forwardly projecting tongue having at its forward end means for supporting it vertically on the drawbar of a tractor; a crop-treating mechanism supported on the frame and having a forwardly positioned elevator including an elevator housing terminating in a forwardly opening crop inlet, said elevator housing having vertical side walls interconnecting opposite fore-and-aft edges of overhead and bottom walls; a housing extension including a front upright structure and a pair of upright side wall extensions extending rearwardly from the front structure alongside the inner surfaces of the side walls and a bottom wall extension horizontally hinged to the front structure and extending into and lying on the upper surface of the bottom wall; transverse horizontal pivot means pivotally mounting the side wall extensions to swing fore-and-aft with respect to the housing; extensible and retractable link means connected to and for positioning the housing extension in different fore-and-aft positions with respect to the housing; and means on the upright structure for connecting the latter to a multi-row crop harvester.

5. The harvester as set forth in claim 4 in which the extensible and retractable link means includes a hydraulic cylinder that is anchored on the frame and housing extension.

6. The harvester as set forth in claim 4 in which the extensible and retractable link means includes a telescoping link that has lock means thereon for fixing the effective length of the link at selective lengths.

* * * * *